(12) United States Patent
Cline et al.

(10) Patent No.: US 6,738,458 B1
(45) Date of Patent: May 18, 2004

(54) METHODS AND SYSTEMS FOR CHANGING THE DOMAIN ASSOCIATION OF A MAILBOX IN A MESSAGING SYSTEM

(75) Inventors: John E. Cline, Lawrenceville, GA (US); Darrell Morgan, Roswell, GA (US); Joe H. Myers, Pelham, AL (US)

(73) Assignee: Bell South Intellectual Property Corporation, Wilmington, DE (US)

( * ) Notice: Subject to any disclaimer, the term of this patent is extended or adjusted under 35 U.S.C. 154(b) by 23 days.

(21) Appl. No.: 09/710,990

(22) Filed: Nov. 9, 2000

Related U.S. Application Data

(60) Provisional application No. 60/164,391, filed on Nov. 9, 1999.

(51) Int. Cl.[7] ............................................. H04M 1/64
(52) U.S. Cl. ..................... 379/88.18; 379/67.1; 379/84; 379/88.13; 379/88.17; 379/88.22; 379/88.25
(58) Field of Search ........................... 379/67.1, 83, 84, 379/88.04, 88.13, 88.17, 88.18, 88.22, 88.25, 88.26, 88.27; 455/412, 413, 414, 417

(56) References Cited

U.S. PATENT DOCUMENTS

| | | | | |
|---|---|---|---|---|
| 4,933,967 A | * | 6/1990 | Lo et al. ...................... | 379/207 |
| 5,193,110 A | * | 3/1993 | Jones et al. ............... | 379/93.14 |
| 5,230,048 A | * | 7/1993 | Moy ........................... | 395/600 |
| 5,317,628 A | | 5/1994 | Misholi et al. ........... | 379/89.14 |
| 5,430,719 A | | 7/1995 | Weisser, Jr. ................ | 370/58.2 |
| 5,493,607 A | * | 2/1996 | Arumainayagam et al. ........................ | 379/88.18 |
| 5,509,061 A | * | 4/1996 | Amereller et al. .......... | 379/229 |
| 5,524,139 A | | 6/1996 | Jones ........................... | 379/67 |
| 5,586,173 A | | 12/1996 | Misholi et al. .......... | 379/89.13 |
| 5,623,538 A | * | 4/1997 | Petty ........................ | 379/88.13 |
| 5,659,599 A | * | 8/1997 | Arumainayagam et al. .......................... | 379/67.1 |
| 5,668,855 A | | 9/1997 | Misholi et al. .......... | 379/89.22 |
| 5,680,444 A | * | 10/1997 | Reeves ......................... | 379/67 |
| 5,787,153 A | * | 7/1998 | Bankay et al. ................. | 379/88 |
| 5,909,483 A | | 6/1999 | Weare et al. ............. | 379/88.18 |
| 5,915,004 A | * | 6/1999 | Pabbati et al. ........... | 379/10.08 |
| 6,115,455 A | | 9/2000 | Picard ........................ | 379/67.1 |

OTHER PUBLICATIONS

"NSP—Access NP", www.comversens.com/prodserv/products/accessnp.htm
"Platform Management", www.comversens.com/prodserv/products/np–man.htm
"Hardware Architecture", www.comversens.com/prodserv/products/np–hard.htm
"Software Architecture", www.comversens.com/prodserv/products/np–soft.htm
"Services to Succeed", www.comversens.com/prodserv/products/np–serv.htm
"System Specifications", www.comversens.com/prodserv/products/np–spec.htm

* cited by examiner

*Primary Examiner*—Allan Hoosain
(74) *Attorney, Agent, or Firm*—Nora M. Tocups, Esq.

(57) ABSTRACT

Methods and systems are presented for changing the association of a mailbox from a first domain to a second domain in a messaging system that includes mailboxes organized into domains. Advantageously, the change is effected with only minor interruption to messaging services to the subscriber of the mailbox. With respect to a mailbox record including fields for mailbox name and for a list of other names, the new mailbox name is added to the list of other names and new corresponding names are added also to the list of other names. A change is made to the domain in the record for the mailbox in the table of incoming trunk configuration. After the change in the table, the new mailbox name and the new corresponding names are removed from the list of other names in the mailbox record. The old mailbox name is changed to the new mailbox name in the mailbox name field of the mailbox record. The old mailbox name is added to the list of other names. The domain is changed in the record for the mailbox in the table of integration configuration. The old mailbox name then is deleted from the list of other names.

19 Claims, 13 Drawing Sheets

| INCOMING TRUNK CONFIGURATION | |
|---|---|
| DOMAIN | MAILBOXES |
| 404 | 555-1234 ⋮ 555-9999 |
| OTHER DOMAIN | NXX-XXXX ⋮ NXX-9999 |
| ANOTHER DOMAIN | NXX-XXXX ⋮ NXX-XXXX |

FIG. 4

| MAILBOX NAME | OTHER NAMES |
|---|---|
| 404-555-1234 (home) | 404-555-9999 (fax) |
| | 404-555-5678 (business) |

FIG.5

| MAILBOX NAME | OTHER NAMES |
|---|---|
| 404-555-1234 | 404-555-9999 |
| | 404-555-5678 |
| | 770-555-1234 |
| | 770-555-9999 |
| | 770-555-5678 |

| MAILBOX NAME | OTHER NAMES |
|---|---|
| 404-555-1234 | 404-555-9999 |
| | 404-555-5678 |

FIG.8C

| MAILBOX NAME | OTHER NAMES |
|---|---|
| 770-555-1234 | 770-555-9999 |
| | 770-555-5678 |

FIG. 9

| INTEGRATION CONFIGURATION | |
|---|---|
| DOMAIN | RANGE OF MAILBOXES |
| DOMAIN | 555-1234 ... 555-9999 |
| OTHER DOMAIN | NXX-XXXX ... NXX-9999 |
| ANOTHER DOMAIN | NXX-XXXX ... NXX-XXXX |

84
86 — 404
88 — 770

| MAILBOX NAME | OTHER NAMES |
|---|---|
| 770-555-1234 | 770-555-9999 |
| | 770-555-5678 |

FIG. 10

METHODS AND SYSTEMS FOR CHANGING THE DOMAIN ASSOCIATION OF A MAILBOX IN A MESSAGING SYSTEM

CROSS-REFERENCE TO RELATED APPLICATION

The present application claims priority to and the benefit of the prior filed copending and commonly owned provisional application entitled "Procedure for Moving Mailboxes from One Domain to Another", filed in the United States Patent and Trademark Office on Nov. 9, 1999, assigned Application No. 60/164,391, and incorporated herein by reference.

FIELD OF THE INVENTIONS

These inventions generally relate to telecommunications, and particularly, to messaging systems in telecommunication networks. More particularly, these inventions relate to the organization of the mailboxes of subscribers in such messaging systems.

BACKGROUND

A messaging system such as a voice mail service typically provides a subscriber with at least two features: (1) the ability to record a name and/or greeting that will be heard or otherwise reviewed by callers or message senders when they access the subscriber's mailbox; and (2) the ability to retrieve messages that have been left by callers or other message senders and associated with the subscriber's mailbox.

An example of a messaging system is the Access NP® system from Comverse Network Systems, Inc. (CNS), 100 Quannapowitt Parkway, Wakefield, Mass., USA. Information about the Access NP® system is available from the web site of CNS at http://www.comversens.com/prodserv/products/accessnp.htm. The information at that web site on the Access NP® system including information on platform management, hardware architecture, software architecture, services to succeed, and specifications is incorporated herein by reference.

Also refer for further information on messaging systems to the following patents assigned to Comverse Technology Inc.; U.S. Pat. No. 5,317,628 Message Management System; U.S. Pat. No. 5,586,173 Message Management System; U.S. Pat. No. 5,668,855 Message Management System; and U.S. Pat. No. 5,909,483 Remote Subscriber Migration. Further see the following patents assigned to Boston Technology, Inc.: U.S. Pat. No. 6,115,455 Method and Apparatus for Dynamically Creating Message Mailboxes; U.S. Pat. No. 5,659,599 Voice Mail Network and Networking Method; and U.S. Pat. No. 5,524,139 System for Automatic Access to Automated Telephonic Information Services. All of the above patents are incorporated herein by reference.

The Access NP® system includes hardware and software components with the software components including at least three general programs: system administration; maintenance mode; and online diagnostics. The system administration program includes administration features for mailboxes for subscribers to the messaging services provided by the system. A subscriber may be provided with voice mail service by the Access NP® system, and for such voice mail service, the subscriber may be assigned one or more voice mailboxes. Typically, each voice mailbox has a name or address so that the mailbox may be accessed. The name or address of a voice mail box may be a number that corresponds to a subscriber's telephone or other number. For example, a subscriber's voice mailbox may be assigned the number 404.815.6213 corresponding to the subscriber's telephone number in the NPA-NXX-XXXX format. (NPA refers to the numbering plan area or area code for the telephone number; NXX generally refers to the telephone exchange serving the telephone number; and XXXX refers to the particular number assigned to the subscriber.) Of course, the subscriber may have other voice mailboxes whose numbers correspond to numbers or identifiers for such other devices. For example, in addition to a voice mailbox corresponding to his or her telephone (landline/Wireline) number, the subscriber may have a voice mailbox corresponding to the number of his or her wireless unit such as a cellular unit.

A messaging system such as the Access NP® system may serve thousands of subscribers and include thousands of mailboxes. To provide a subscriber with service, the messaging system must be able to readily access or to readily provide access to the subscriber's mailbox. Given that the messaging system may include thousands of mailboxes, the mailboxes may be organized into groups or associated with respective domains so as to facilitate access to any particular mailbox. When mailboxes of a messaging system are organized into groups or associated respectively into domains, then a particular mailbox generally is accessed through the use of the group or domain with which the voice mailbox is associated. Thus, the group or domain with which a mailbox is associated also may be referred to as an addressing domain in the sense that a mailbox is addressed or accessed through its group or domain.

The addressing domains of a messaging system may be set up so as to include or be associated with mailboxes having a common feature or attribute. For example, an addressing domain may be set up as the "404 domain". Mailboxes whose numbers follow the telephone number format and include "404" as the NPA may be associated with the 404 domain. Thus, a mailbox with the number of 404.815.6213 is accessed through the 404 domain of the messaging system. Of course, an addressing domain in a messaging system may be set up so as to include or be associated mailboxes having a common feature other than an NPA. As an example, assume a company adopts a messaging system for use by its employees. A mailbox on the messaging system may be assigned respectively to each employee. All of the mailboxes assigned to the employees of the company may be associated with the same domain such as a "company domain".

An association of a mailbox with a particular domain is not necessarily a permanent association. Events may transpire that lead to a change in association of a mailbox from one domain to another domain in the messaging system. For example, initially, a particular mailbox may have a feature in common with the other mailboxes associated with its domain, but that feature may change with respect to that particular mailbox. An example of a change in a common feature is that of a change in the NPA of a subscriber's telephone number. Typically, a change in the subscriber's telephone number leads to a corresponding change in the number of the subscriber's mailbox for that telephone number. Referring to a previous example, the 404.815.6213 telephone number of a subscriber may become the new number of 770.815.6213. With the change, the new number of the subscriber's mailbox may no longer have a common feature with the other numbers for mailboxes associated with the 404 domain. The association between the subscriber's new mailbox number and the 404 domain is no longer valid for accessing the subscriber's mailbox. A change in the association of the mailbox from the 404 domain to the 770 domain may need to be made to facilitate ready access to the subscriber's mailbox with its new number.

Messaging systems such as the Access NP® system include processes for the change in association of a mailbox from one domain to another domain. These processes generally simply change the mailbox name in the appropriate field to reflect the change in domain.

Generally, such processes for changing the association of a mailbox from one domain to another domain in messaging systems have been problematic. An area of problems relates to the handling of information relating to miscellaneous services provided to a subscriber in addition to or in connection with the subscriber's messaging service. To provide such miscellaneous services, a call to the subscriber's mailbox may need to be forwarded or otherwise routed to another element, and/or information relating to the call must be provided to and/or obtained from another element. The information for the provision of the miscellaneous services to the subscriber may be present in connection with the association of the subscriber's mailbox with an original domain. But this information may be lost or convoluted as the result of a process used to change the association of the subscriber's mailbox from the original domain to a new domain. If the information is lost or convoluted, then the subscriber may not receive or may not properly receive the miscellaneous services.

Another area of problems relates to service interruptions caused by the process(es) used to change the association of a subscriber's mailbox from one domain to another domain. The interruption in messaging service to a subscriber for the change in domain may take several hours, and even as long as a couple of days. During this interruption caused by the domain change process, neither the subscriber nor callers to the subscriber's number have access to the subscriber's mailbox. In effect, the subscriber is left without messaging service during the relatively lengthy domain change process. Leaving a subscriber without messaging service for such a relatively lengthy period of time is unacceptable in today's competitive world of telecommunications.

Accordingly, there is a need making changes to the association of a mailbox from one domain to another domain in a messaging system such that the change process does not mishandle information relating to other services provided to the subscriber and does not leave a subscriber without messaging service for a lengthy period of time during the change process.

SUMMARY OF THE INVENTION

Methods and systems are presented for changing the association of a mailbox from a first domain to a second domain in a messaging system that includes mailboxes organized into domains. Advantageously, the change in domain association is carried out with only relatively brief interruption to messaging services provided to the subscriber.

If the domain to which the mailbox is to be changed is a new domain, then the new domain is created in the messaging system. Information relating to mailbox for use in the domain change may be obtained or otherwise accessed as necessary. This information corresponds to the entries from the relevant fields of the mailbox record associated with the mailbox having its domain changed and included in the database of the messaging system. As the information is changed, the information may be returned to or changed in the appropriate fields and their storage locations in the messaging system as appropriate so that the information may be used in providing messaging services to the subscriber.

A new mailbox name is created for the mailbox. The new mailbox name is added as an entry to the field including the list of other names in the mailbox record. Even though a new mailbox name is created and added as an entry to the list of other names, the entry in the mailbox name field is not deleted or changed. The entry in the mailbox name field remains the old mailbox name, to-wit: old domain+mailbox number.

Another field of the mailbox record that may be relevant to the change in domain is the field including the list of other names. Other than the entry of the new mailbox name, the list of other names may be empty of entries in the mailbox record, or the list may include one or more entries. An entry in the list of other names may include an "other name" as follows: domain+other number. If the list of other names includes one or more entries, then for each entry, a new corresponding entry is created. Each new corresponding entry includes a new "other name", to-wit: new domain+corresponding other number. The "other number" in the other name of an existing entry in the list of other names is used as the "corresponding other name" in the new other name of the new corresponding entry for the list of other names.

A change then is effected in the incoming trunk configuration with respect to the mailbox having its domain changed. In particular, the data relating to the incoming trunk configuration is changed such that the old domain in the mailbox name of the mailbox is changed to the new domain. By this change, the routing of calls is changed to comport with the change in domain of the mailbox.

Advantageously, despite the change in the domain in the incoming trunk configuration, the messaging services to the subscriber continue because there are entries in the mailbox name field and in the field including the list of other names that cover both the new domain and the old domain with respect to the subscriber, the subscriber's mailbox name, and the subscriber's other numbers related to the subscriber's mailbox. By this coverage, calls to the subscriber are properly routed to the subscriber's mailbox.

However, as the next action in the change in domain association for the mailbox, the new mailbox name added as an entry to the field including the list of other names is deleted from the list of other names. The old entries in the list of other names are not changed nor deleted from the list.

The deletion is necessary so as to later allow the entry in the mailbox name field to be changed to include the new domain in the mailbox name. Why can't the change in domain occur in the entry in the mailbox name field without the deletion? Because the entry in the mailbox name field cannot be the same as an entry in the list of other names. The entry in the mailbox name field cannot be changed to the new domain without the deletion because that would result in duplicate entries in the mailbox name field and in the field including list of other names. The new corresponding entries in the list of other names also may be deleted.

As a result of the deletion, the entries for the fields of mailbox name and list of other names appear before any alterations taken to effect the change in domain have been made. In other words, the entry for the mailbox name is old domain+mailbox number, and the entries in the list of other numbers include the old domain+other numbers.

As the next action in the change of domain association for the mailbox, the entry in the field of the mailbox name is changed. In the mailbox name field, the old mailbox name is changed to the new mailbox name so as to reflect the new domain. After the change, the entry in the field of the mailbox name appears as: new domain+mailbox number. Similarly, if the field including the list of other names includes one or more entries, each such entry is changed to a new entry. The old other name in each old entry is changed so as to reflect a new other name in the new entry. After the change, each entry in the list of other names appears as new domain+other number.

The changes described in the previous paragraph are made to follow the change in domain effected in the incoming trunk configuration. Particularly, the described changes are made to have the mailbox record (particularly the fields of mailbox name and list of other numbers) reflect the domain name change so that calls to the subscriber are properly routed based on the incoming trunk configuration to the subscriber's mailbox including its change in domain association. The described changes may interrupt messaging services to the subscriber, but such interruption is generally very brief (two–six seconds according to the inventors). The interruption is generally brief because only a few seconds are necessary to carry out the described. The bases are laid for these few seconds of interruption by the changes initially taken with respect to the change in domain association for the mailbox. Those initial actions may be carried out without interruption in messaging services to the subscriber. Thus, the present inventions allow for a change in domain association of a mailbox by carrying out certain actions while messaging service continues without interruption so as to allow for only the briefest interruption when necessary to make other changes.

As the next action in the change in domain association for the mailbox, the list of other numbers is changed further by the addition of an entry for the old mailbox name. In particular, the old mailbox name including the old domain+mailbox number is added as an entry to the list of other numbers. The inclusion of the old mailbox name as an entry to the list of other numbers takes care of these other "outgoing" signals and messages at least until other actions are taken that affect those other signals and messages.

As the next action, the entries in the other fields of the mailbox record are changed as necessary or appropriate. For example, one of the fields of the mailbox record may be the list of routed names. The list of routed names may include as entries mailbox names. For each of these entries, the mailbox name is changed so as to change the old domain to the new domain in the mailbox name. The changes in the other fields are effected so as to properly route calls that may be based on data in these other fields.

As the next action, a change is effected in the integration configuration with respect to the mailbox having its domain changed. In particular, the data relating to the mailbox is changed such that the old domain in the mailbox name of the mailbox is changed to the new domain. By this change, the routing of signals, messages, etc. pertaining to such services as message waiting indicators (MWIs—whether stutter dialtone, visual, or other indicator of a message received for the subscriber) is changed to comport with the change in domain of the mailbox.

Finally, other references to the old domain of the mailbox in the mailbox record and elsewhere in the messaging system or platform may be changed to the new domain, or deleted as appropriate.

BRIEF DESCRIPTION OF THE DRAWINGS

FIG. 4 illustrates an exemplary table of information relating to incoming trunk group configuration as may be used in exemplary embodiments of the present inventions.

FIG. 5 illustrates fields of a mailbox record as may be used in exemplary embodiments of the present inventions.

FIG. 6 illustrates fields of a mailbox record as may be used in exemplary embodiments of the present inventions.

FIGS. 8A–8D illustrate fields of a mailbox record as may be used in exemplary embodiments of the present inventions.

FIG. 9 illustrates an exemplary table of information relating to integration configuration as may be used in exemplary embodiments of the present inventions.

FIG. 10 illustrates fields of a mailbox record as may be used in exemplary embodiments of the present inventions.

DETAILED DESCRIPTION

Methods and systems are presented for changing the association of a mailbox from a first domain to a second domain in a messaging system that includes mailboxes organized into domains. Advantageously, the change in domain association is carried out with only relatively brief interruption to messaging services provided to the subscriber.

Figure 1:
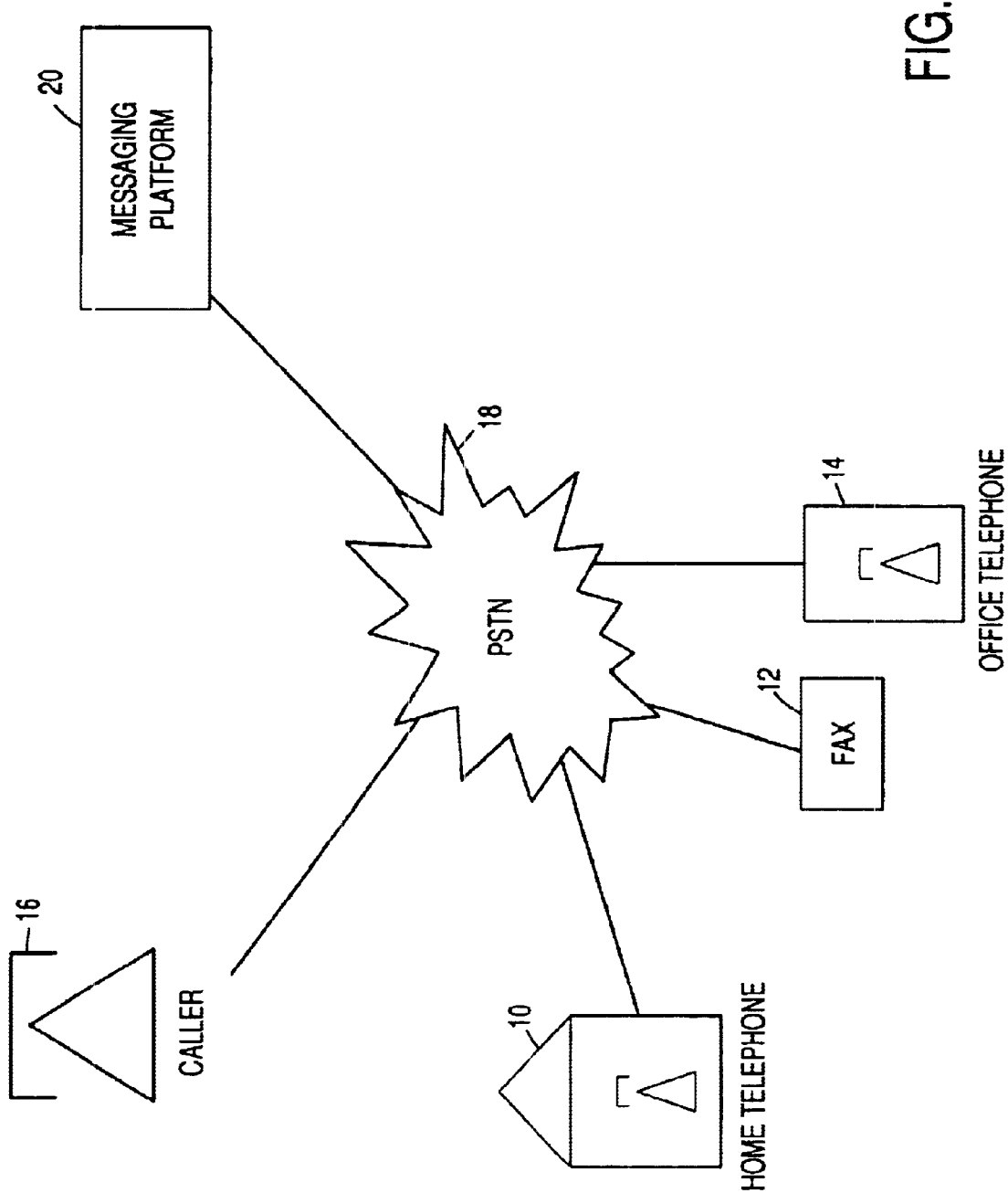
FIG. 1 illustrates an exemplary environment of the present inventions.

FIG. 1—Exemplary Environment

Exemplary embodiments of the present inventions are described in the context of the exemplary environment illustrated in FIG. 1. Of course, the present inventions may be implemented in other environments.

FIG. 1 illustrates the use of a messaging service made by a subscriber who has a home telephone 10, a facsimile machine (FAX) 12, and an office telephone 14. Other communication devices (such as wireless units, personal digital assistants, pagers, computers, etc.) may be provided with such messaging service. In this exemplary environment, the subscriber subscribes to a network messaging service that allows for messages from a telephone of a caller 16 to be routed through the public switched telephone network (PSTN) 18 to a messaging platform 20 hosting the messaging system providing the messaging services to the subscriber. The caller 16 is illustrated as using a telephone, but the caller may be a communications device rather than a person. The caller may use some other communication device than the telephone 16. Further, the exemplary environment illustrates provision of network messaging services through the PSTN 18, but the messaging services may be provided through other networks such as data networks, global communication networks such as the Internet, intranets, and the like. The PSTN 18 may be omitted from use with such other networks or the PSTN 18 may be used at least partially with such other networks.

Implementation of the Present Inventions in the Messaging System Environment

The inventions described herein may be implemented in a messaging system in a messaging platform, a network services platform, or the like devices, and may be distributed across one or more platforms, or the like devices. Generally, a platform(s) or the like devices may be considered as a computing environment where the inventions described herein are implemented through software (also referred to as programs, applications, scripts, modules, objects, or the like) that run in connection with operating systems used by the platform(s) or the like devices. The present inventions also may be implemented in combination with other software, programs, applications, modules, scripts, or the like and on other devices than systems or platforms dedicated exclusively to messaging functions. Generally, the implementing software or the like may include routines, programs, components, data structures, objects, scripts, etc. that perform particular tasks or implement particular abstract data types.

Even though the exemplary embodiments of the inventions are described in connection with a messaging system, the inventions may be practiced with other systems, other computing environments, other configurations or distributions, including hand-held devices, multi-processor systems, microprocessor-based or programmable consumer electronics, mini-computers, mainframe computers, and the like. The inventions also may be practiced in remote processing devices that are linked through a communications network. In distributed computer environments, the implementing software or the like may be located and used in both local and remote devices including local and remote memory storage devices.

For example, a messaging system may be implemented on a computer or computer system including a processing unit, a system memory, and a system bus that couples the memory to the processing unit. The system memory may include read only memory (ROM) and/or random access memory (RAM). The computer may include a hard disk drive, a magnetic disk drive, (e.g., to read from or write to a removable disk), and/or an optical disk drive, (e.g., for reading a C-ROM disk), and/or to reach from and/or write to other optical media. The hard disk drive, magnetic disk drive, and/or optical disk drive may be connected to the system bus by interfaces. The drives and their associated computer-readable media may provide non-volatile storage for the computer. Although the description of computer-readable media above refers to a hard disk, a removable magnetic disk and a CD-ROM disk, other types of media that are readable by a computer, such as magnetic cassettes, flash memory cards, digital video disks, Bernoulli cartridges, and the like, also may be used.

A number of programs or the like (such as may be used to implement the present inventions) may be stored in the drives and/or RAM of the computer. A user may enter commands and/or information into the computer through a keyboard, pointing device, mouse, and/or other input device (s). The input device(s) may be connected to the processing unit via interfaces coupled to the system bus. A display device (such as a monitor or video device) or other type of output device may also be connected to the system bus via an interface, such as a video adapter. In addition to the display device, a computer typically includes other peripheral devices such as speakers, printers, and the like.

The computer may operate in a networked environment using logical connections to one or more remote computers. The remote computer may be a server, a router, a peer device, network node, or other device, and typically includes many or all of the elements described above in connection with the computer. The logical connections may include a local area network (LAN), a wide area network (WAN), and other connections to communication networks like intranets and intra-networks, global communication networks (the Internet), and/or the public switched telephone network (PSTN), or the like.

Figure 2:
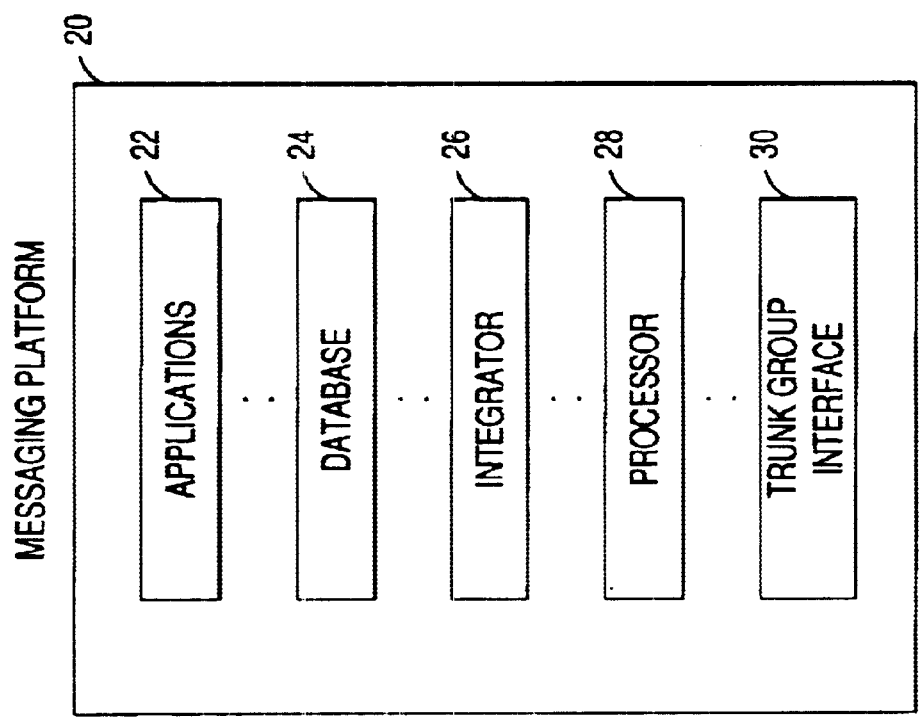
FIG. 2 illustrates an exemplary messaging platform as may be used with exemplary embodiments of the present inventions.

FIG. 2—Exemplary Messaging Platform

FIG. 2 illustrates an exemplary messaging platform 20 as may be used in connection with exemplary embodiments of the present inventions. Such an exemplary messaging platform 20 may be the Access NP® described above in the background or other messaging system or service. An exemplary messaging platform 20 may include many interconnected components and may include the interconnected components illustrated in FIG. 2 such as an applications component 22. An applications component also may be referred to as software, programs, and the like. Other components may include: a database unit(s) 24; an integrator 26 including integration unit(s) for integration of the messaging system with other networks and systems; a processor 28 (also referred to as a controller or a master control unit (MCU)); and interface functions as necessary to implementation of the messaging services such as the trunk group interface 30.

In providing a subscriber with network messaging services, a messaging platform 20 such as illustrated in FIG. 2 may include communications functionalities appropriate to interaction with data networks and with telecommunications networks. For further information on such communications functionalities and elements of a telecommunications networks such as the Advanced Intelligent Network (AIN) with which the messaging platform 20 may communicate, see Weisser, Jr., U.S. Pat. No. 5,430,719, which is incorporated herein by reference.

The applications component 22 may include programs for system administration, maintenance, diagnostics, etc. The system administration program may include administration features for mailboxes for subscribers to the messaging services provided by the system. The information pertaining to mailboxes may be stored in the database 24 or elsewhere.

Figure 3:
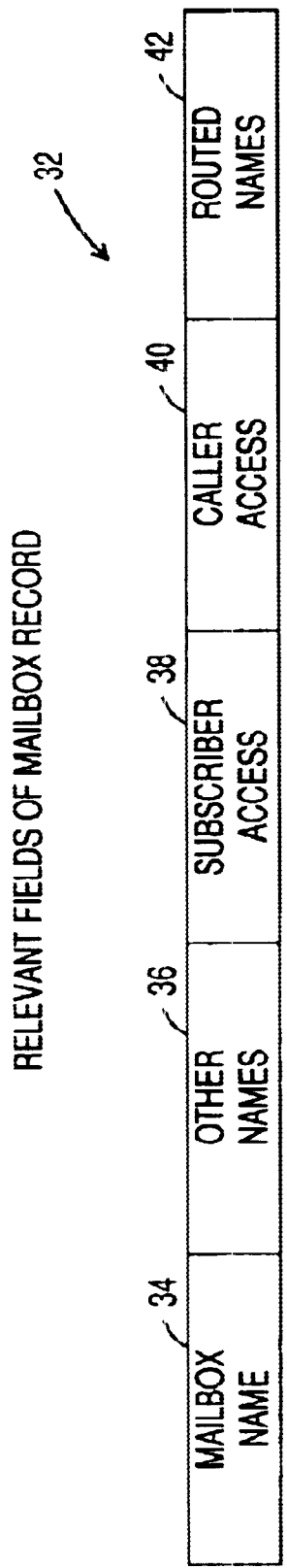
FIG. 3 illustrates fields of a mailbox record as may be used in exemplary embodiments of the present inventions.

FIG. 3—Exemplary Fields of a Mailbox Record

A subscriber may be provided with voice mail service or other messaging services through the messaging platform 20. For such service, the subscriber may be assigned one or more mailboxes. Typically, each mailbox has a name, address, or other identifier so that the mailbox for the correct subscriber may be accessed when necessary. The name of a mailbox and other information related to the mailbox may be stored in fields in a mailbox record, which may be stored with other mailbox records in the database 24 of the messaging platform 20.

FIG. 3 illustrates an exemplary mailbox record 32 including the following fields: mailbox name 34; other names (also referred to as list of other names or phone list or phone list entries) 35; subscriber access (also referred to as direct number or direct entry) 38; caller access (also referred to as forwarded number(s) or forwarded entry) 40; and routed names (also referred to as list of routed names, list of forward names or entries; forwarded names, or forwarded numbers) 42.

The mailbox name 34 includes only a single entry and it may not be duplicated at least in the fields of the list of other names 36, and possibly other fields of the mailbox record 32. The entry or mailbox name 34 of a mailbox may be a number that corresponds to a subscriber's telephone or other number. For example, a subscriber's mailbox may be assigned the number 404.555.1234 corresponding to the subscriber's telephone number in the NPA-NXX-XXXX format. (NPA refers to the numbering plan area or area code for the telephone number; NXX generally refers to the telephone exchange serving the telephone number; and XXXX refers to the particular number assigned to the subscriber.) Of course, the subscriber may have other mailboxes whose numbers correspond to numbers or identifiers for such other devices. For example, in addition to a voice mailbox corresponding to his or her telephone (landline/wireline) number, the subscriber may have a voice mailbox corresponding to the number of his or her wireless unit such as a cellular unit. Alternatively, the FIG. 1, the subscriber may set up messaging service through the messaging platform such that calls or other messages directed to the home telephone 10, fax 12, and/or office telephone 14 may be retrieved through a call or other communication to a single mailbox. This single mailbox is identified by a single mailbox name stored in the appropriate field of mailbox name 34 in the mailbox record. For this example, the subscriber's mailbox name corresponds to the home telephone number of 404.555.1234. The subscriber's other communications devices have numbers as well, and calls or messages to these numbers may be recorded in and accessed in connection with the mailbox having the name 404.555.1234. To accommodate this concentration of messaging services in a single mailbox, the numbers for the subscriber's fax 12 (404.555.9999) and the office telephone (business)(404.555.5678) are stored in another field of the mailbox record 32. This other field is referred to as the other names field 36. Calls or messages to the numbers in the other names field are recorded for the subscriber's mailbox. A similar function may be carried out by the routed names field 42 in the mailbox record 32.

The other two fields in the mailbox record, the subscriber access field 38 and the caller access field 40, relate to access to the subscriber's mailbox. Whether the subscriber is allowed access to the mailbox is appropriately marked in the subscriber access field 38. Similarly, whether callers or other message deliverers may access the mailbox is appropriately marked in the caller access field 40.

A network messaging system such as implemented in messaging platform 20 may serve thousands of subscribers and include thousands of mailboxes. To provide a subscriber with service, the messaging system must be able to readily access or to readily provide access to the subscriber's mailbox. Given that the messaging system may include thousands of mailboxes, the mailboxes may be organized into groups or associated with respective domains so as to facilitate access to any particular mailbox. When mailboxes of a messaging system are organized into groups or associated respectively into domains, then a particular mailbox generally is accessed through the use of the group or domain with which the voice mailbox is associated. Thus, the group or domain with which a mailbox is associated also may be referred to as an addressing domain in the sense that a mailbox is addressed or accessed through its group or domain.

The addressing domains of a messaging system may be set up so as to include or be associated with mailboxes having a common feature or attribute. For example, an addressing domain may be set up as the "404 domain". Mailboxes whose numbers follow the telephone number format and include "404" as the NPA may be associated with the 404 domain. Thus, a mailbox with the number of 404.555.1234 is accessed through the 404 domain of the messaging system. Of course, an addressing domain in a messaging system may be set up so as to include or be associated mailboxes having a common feature other than an NPA. As an example, assume a company adopts a messaging system for use by its employees. A mailbox on the messaging system may be assigned respectively to each employee. All of the mailboxes assigned to the employees of the company may be associated with the same domain such as a "company domain".

In the exemplary embodiment, a subscriber's mailbox name as well as the numbers associated with the subscriber's communications devices provided with messaging services include the domain. Referring to FIG. 3, the mailbox name field 34 includes the name of the mailbox (as noted for this example—404.555.1234) and this name has two parts: (1) the domain (404); and (2) the number (555.1234).

FIG. 4—Table of Incoming Trunk Configuration

As noted, the messaging platform 20 communicates with other elements in communications networks so as to provide the messaging services to the subscriber. Part of this communication includes the use of trunk groups for connections to these other networks. When a message arrives for delivery to the subscriber's mailbox, a table of incoming trunk configuration may be accessed so as to appropriately route the message to the mailbox. The domains of the mailboxes on the platforms are used in this routing. Thus, the table of incoming trunk configuration may include information relating any particular domain to the mailboxes grouped or associated with that domain.

FIG. 4 illustrates a table of incoming trunk configuration 44 including a domain of "404" 46 and its associated mailboxes including numbers ranging from 555-1234–555-9999 48. The table 44 may include other records such as a domain marked "other domain" 50 with its associated mailboxes including numbers ranging from NXX-XXXX–NXX-9999 52, and a domain marked "another domain" 54 with its associated mailboxes including numbers ranging from NXX-XXXX–NXX-XXXX 56.

FIGS. 5–10—Exemplary Embodiments of Changing A Mailbox's Domain

An association of a mailbox with a particular domain is not necessarily a permanent association. Assume the subscriber whose communications devices are illustrated in FIG. 1 is informed of a change in area code (or NPA) from 404 to 770 for these devices. In the mailbox name and other names in the subscriber's messaging service, the domain for all of these devices has been "404", but the new domain is to be 770 to correspond to the change in area based on a domain system using NPAs.

FIGS. 5–10 illustrate changes in the information stored with respect to the subscriber's mailbox and related communication devices and how such information alters with the change in domain of the mailbox and its related other names.

Figure 5:
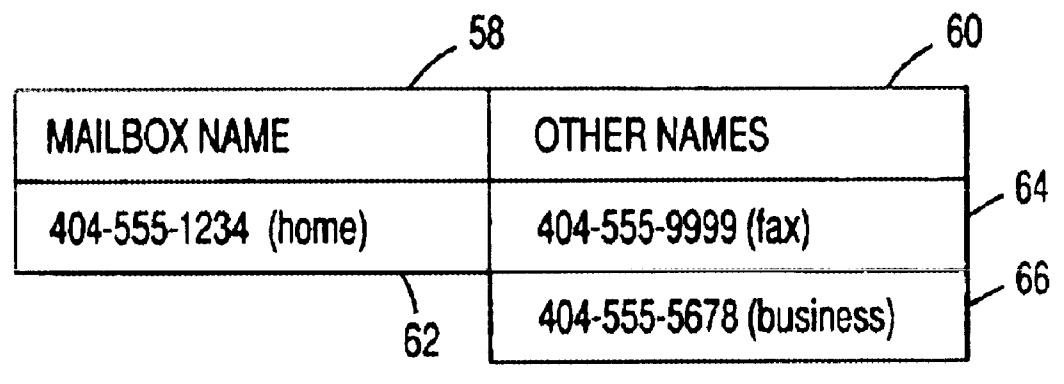

FIG. 5 illustrates two of the relevant fields of the subscriber's mailbox record: the mailbox name 58 and the list of other names 60. The subscriber's mailbox name 64 is illustrated as an entry of 404-555-1234 (reflecting the domain of 404 and the number of 555-1234). The subscriber's devices are referenced as entries in the field including the list of other names 60. These entries include an entry 64 of 404-555-9999 for the subscriber's fax (reflecting the domain of 404 and the number of 555-9999), and an entry 66 of 404-555-5678 for the subscriber's office telephone (reflecting the domain of 404 and the number of 555-5678).

For ease of reference, "old domain" is used to denote the domain from which the mailbox is being changed (404), and "new domain" is used to denote the domain to which the mailbox is being changed (770). Other uses of the terms "old" and "new" follow the same pattern.

Typically, a change in association of domains is carried out with respect to a plurality of mailboxes such as mailboxes having mailbox names with the same domain and with mailbox numbers within a specified range. For purposes of explaining the exemplary embodiment, reference is made to the change in association of only the subscriber's mailbox as it relates to the communication devices illustrated in FIG. 1. The same method generally applies to a plurality of mailboxes having the same old and same new domains.

First, a new domain is created for the domain of 770 on the messaging platform as necessary. Then, the information for use in the domain change is obtained or otherwise accessed as necessary. This information for the example being discussed is the information illustrated in FIG. 5 as explained above. As the information is changed, the information may be returned to or changed in the appropriate fields and their storage locations in the messaging system as appropriate so that the information may be used in providing messaging services to the subscriber.

Next, a new mailbox name is created for the mailbox. In this example, the new mailbox name is 770-555-1234. Instead of replacing the old mailbox name (404-555-1234) 62 with the new mailbox name in the mailbox name field 58, the new mailbox name is added as an entry 68 to the field including the list of other names in the mailbox record. FIG. 6 illustrates the relevant fields including the entries as illustrated in FIG. 5, but with additions. As noted, the first of these additions is the addition of the entry 68 including the new mailbox name (770-555-1234) to the field including the list of other names 60. Even though a new mailbox name is created and added as an entry 68 to the list of other names 60, the entry in the mailbox name field 58 is not deleted nor changed. The entry 62 in the mailbox name field 58 remains the old mailbox name, to-wit: 404-555-1234.

Advantageously, the creation of the new mailbox name (770-555-1234) and its addition as an entry to the field including the list of other names in the mailbox record does not effect the provision of messaging services to the subscriber. Calls that are directed to the subscriber using 404-555-1234 continue to be properly routed to the subscriber's mailbox based on the information in the mailbox record. In addition, calls that are directed to the subscriber using the new mailbox name of 770-555-1234 are properly routed to the subscriber's mailbox based on inclusion as an entry 68 in the other names field 60.

FIG. 6 also illustrates other additions to the field including the list of other names 60. As illustrated in FIG. 5, the list of other names 60 included two entries: 404-555-9999 64 and 404-555-5678 66. Both of these entries 64 and 68 remain in the field of other names 60 as illustrated in FIG. 6. But a new corresponding entry is created for each of these previous entries 64 and 68. Each new corresponding entry includes a new "other name", to-wit: new domain+corresponding other number. Thus, FIG. 6 illustrates that a new corresponding entry 70 (770-555-9999) has been added with respect to previous entry 64 (404-555-9999), and another new corresponding entry 72 (770-555-5678) has been added with respect to previous entry 66.

After the addition of the entries 68, 70, and 72 to the field including the list of other names 60, a change is effected in the incoming trunk configuration with respect to the mailbox (404.555-1234) having its domain 46 changed. See FIG. 7. In particular, the data relating to the incoming trunk configuration is changed such that the old domain of "404" 74 in the mailbox name of the mailbox is changed (as indicated by the cross-out of "404") to the new domain "770" 76. By this change, the routing of calls is changed to comport with the change in domain of the mailbox. In the table of incoming trunk configuration, the corresponding range of mailboxes 48 for the domain 46 being changed (from 404 to 770) does not change. Only the domain changes.

Advantageously, the addition of the entries 68, 70, and 72 to the field including the list of other names 60 allows for messaging services to continue to the subscriber despite the change in the domain in the incoming trunk configuration. Such messaging services continue despite the change in the incoming trunk configuration because there are entries in the mailbox name field and in the field including the list of other names that cover both the new domain and the old domain with respect to the subscriber, the subscriber's mailbox name, and the subscriber's other numbers related to the subscriber's mailbox. By this coverage, calls to the subscriber are properly routed to the subscriber's mailbox.

Figure 8A:
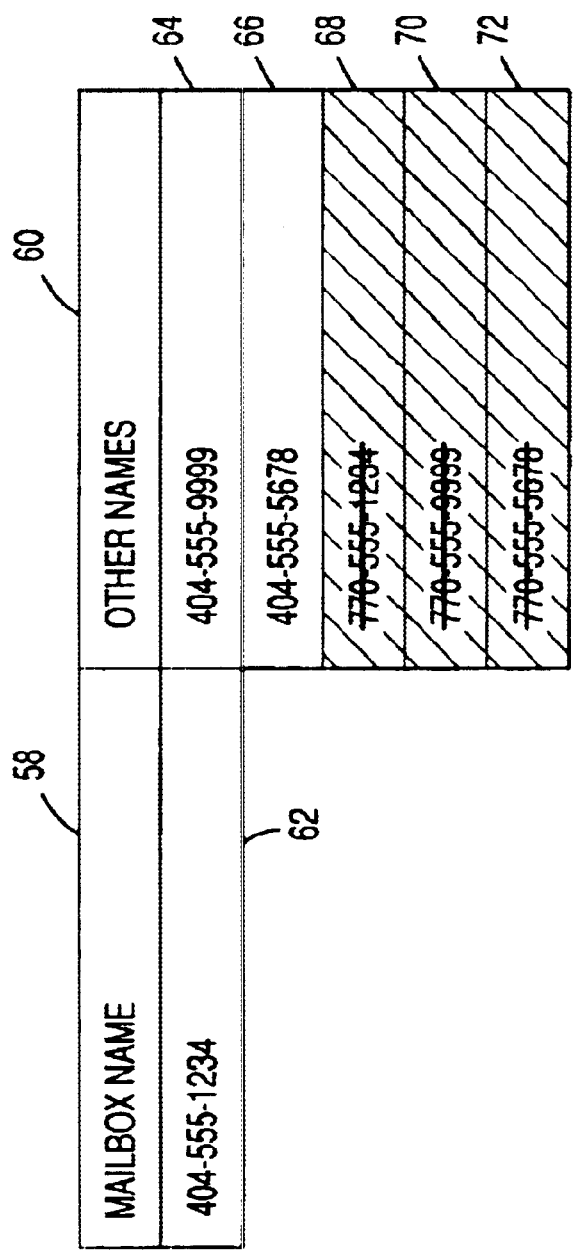

FIG. 8A illustrates an anti-intuitive action in changing the association of the mailbox's domain from 404 to 770. Particularly, the new mailbox name (770-555-1234) added as an entry 68 to the field including the list of other names 60 is deleted (as illustrated by the cross-out of entry 68) from the list of other names 60. The old entries 64, 66 in the list of other names 60 are not changed nor deleted from the list.

The deletion of entry 68 seems anti-intuitive, but is necessary so as to later allow the entry in the mailbox name field 58 to be changed to include the new domain in the mailbox name. Why can't the change in domain occur in the entry in the mailbox name field without the deletion of entry 68 from the list of other names 60? Because, as noted above, the entry in the mailbox name field 58 cannot be the same as an entry in the list of other names 60. The entry in the mailbox name field cannot be changed to the new domain without the deletion of entry 68 from the list of other names 60 because that would result in duplicate entries in the mailbox name field 58 and in the field including list of other names 60.

Similarly, as also illustrated in FIG. 8A, the new corresponding entries 70, 72 previously added to the list of other names 60 are deleted (as illustrated by the cross-outs) from the list 60. The old entries 64, 66 in the list of other names 60 are not changed nor deleted from the list 60. This deletion of new corresponding entries 70, 72 may not be carried out in all embodiments of the present inventions because the deletion of these entries 70, 72 may not be necessary, but the deletion is included herein for purposes of illustration.

As a result of the deletion of entries 68, 60, and 72 from the field including the list of other names 60, the entries for the fields of mailbox name and list of other names appear as they did at the beginning of this explanation. See the relevant fields 58 and 60 and their respective entries 62, and 64 and 66 as illustrated in FIG. 8B, and refer to FIG. 5.

As the next action in changing the association of the subscriber's mailbox from 404 to 770, the entry in the field of the mailbox name is changed. FIG. 8C illustrates that in the mailbox name field, the old mailbox name is changed to the new mailbox name 78 (770-555-1234) so as to reflect the new domain. Each such entry in the field of other names 60 is changed to a new entry 80, 82. After the change, each entry 80, 82 in the list of other names 60 appears as new domain+other number (770-555-9999 and 770-555-5678).

Figure 7:
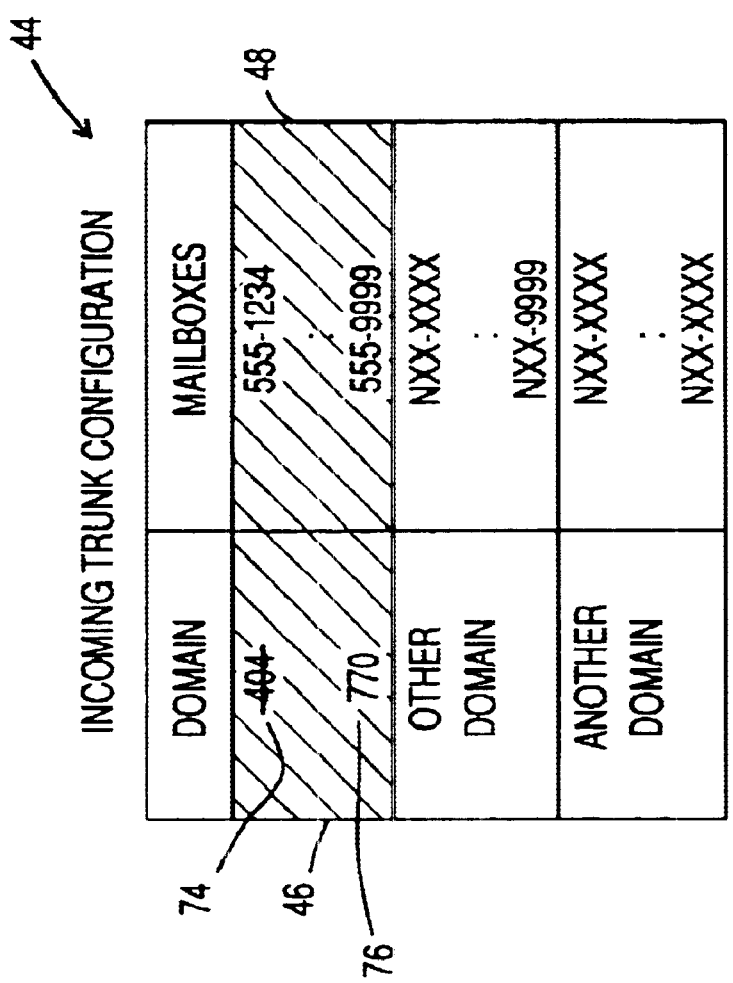
FIG. 7 illustrates an exemplary table of information relating to incoming trunk group configuration as may be used in exemplary embodiments of the present inventions.

The changes to the entries 78, 80 and 82 in their respective fields 58 and 60 are made to follow the change in domain effected in the incoming trunk configuration as illustrated in FIG. 7 and described above. Particularly, the changes are made to have the mailbox record (particularly the fields of mailbox name and list of other numbers) reflect the domain name change so that calls to the subscriber are properly routed based on the incoming trunk configuration to the subscriber's mailbox including its change in domain association. The making of these changes may interrupt messaging services to the subscriber, but such interruption is generally very brief (two–six seconds according to the inventors). The interruption is generally brief because only a few seconds are necessary to carry out the changes to yield entries 78, 80 and 82 in their respective fields 58 and 60. Only these few seconds of interruption may be experienced by the subscriber and such experience would be rare given that the subscriber or a caller would have to be trying to access the subscriber's mailbox during those few seconds. There are only a few seconds of interruption because of the changes (illustrated in FIGS. 6, 8A, and 8B) that have been carried out previous to these changes that yield entries 78, 80, and 82 as illustrated in FIG. 8C. The previous changes (illustrated in FIGS. 6, 8A, and 8B) may be carried out without interruption in messaging services to the subscriber. Thus, the present inventions allow for a change in domain association of a mailbox by carrying out certain actions while messaging service continues without interruption so as to allow for only the briefest interruption when necessary.

Figure 8D:
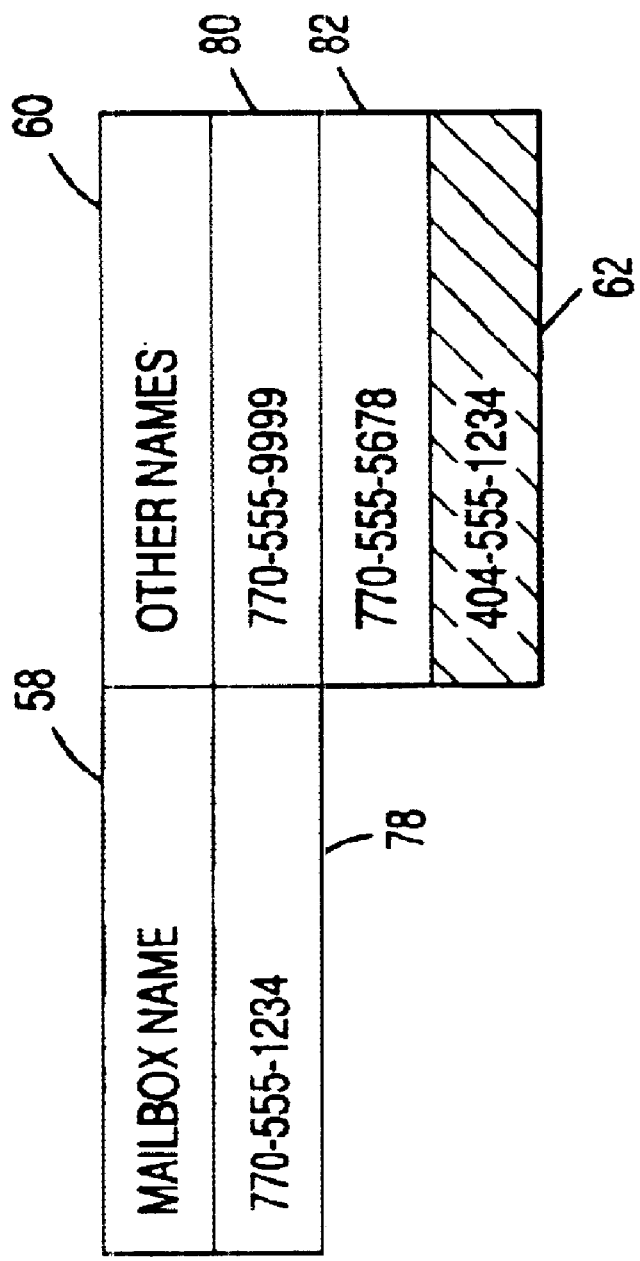

But additional changes are made to the entries in the fields of the mail record. As illustrated in FIG. 8D, the list of other numbers 60 is changed further by the addition of an entry 62 for the old mailbox name (404-555-1234). In particular, the old mailbox name including the old domain+mailbox number is added as an entry to the list of other numbers. Adding entry 62 to the list of other names 60 also may be considered anti-intuitive. Why add the old mailbox name as an entry to the list of other numbers when all of the other entries in the list include names having the new domain? Because no action has yet been taken with respect to outgoing signals and messages from the messaging system that pertain to such services as mail waiting indicators (MWIs) that involve the domain aspects of a mailbox. The inclusion of the old mailbox name as an entry to the list of other numbers takes care of these other "outgoing" signals and messages at least until other actions are taken that affect those other signals and messages.

As illustrated in FIG. 9, a change is effected in the table of integration configuration 84 with respect to the mailbox having its domain changed. In particular, the data relating to the mailbox is changed such that the old domain 86 (indicated by cross-out) is changed to the new domain 88. By this change, the routing of signals, messages, etc. pertaining to such services as message waiting indicators (MWIs—whether stutter dial-tone, visual, or other indicator of a message received for the subscriber) is changed to comport with the change in domain of the mailbox.

Figure 11:
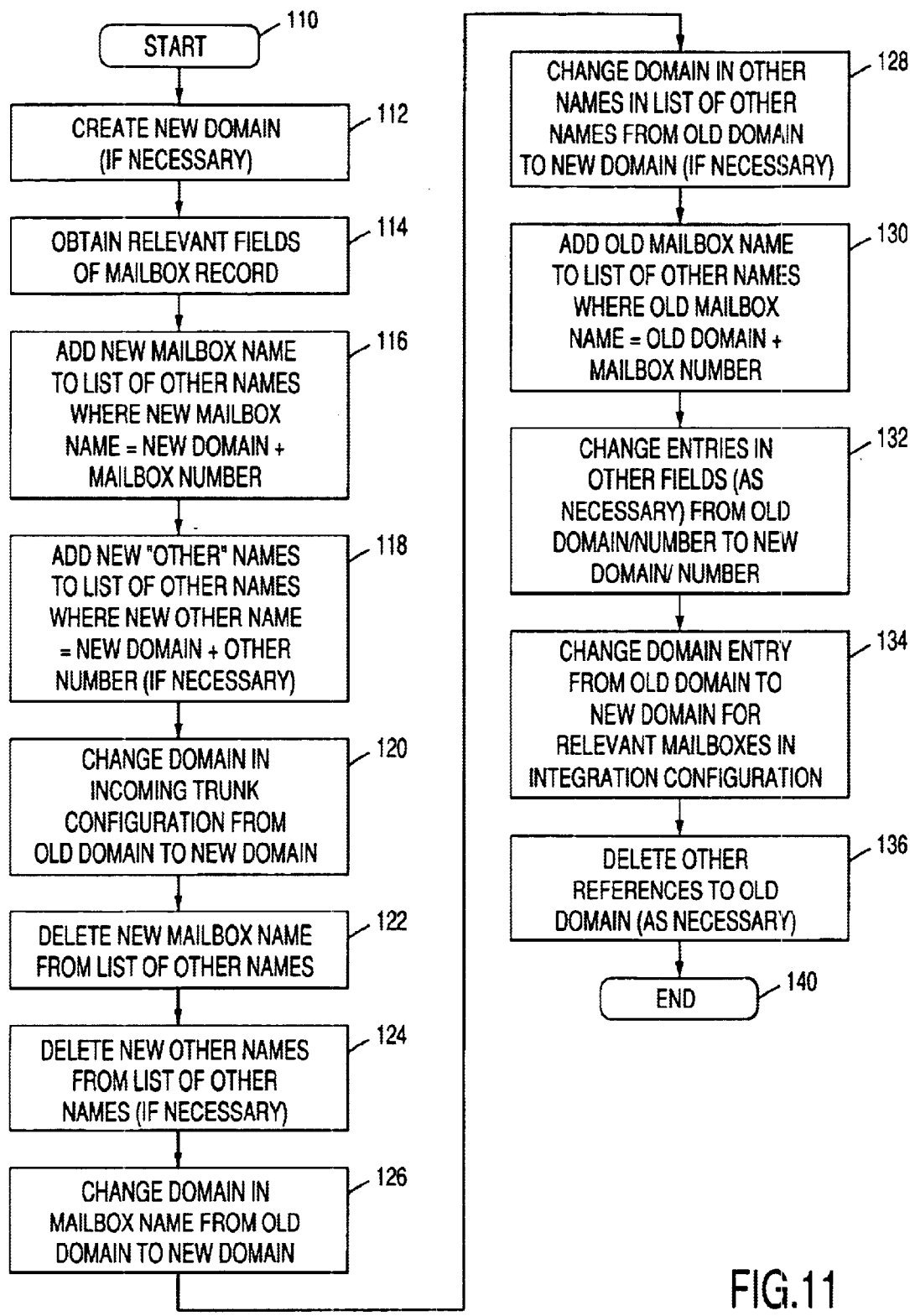
FIG. 11 illustrates an exemplary method of the present inventions.

FIGS. 11A–11C—An Exemplary Method of the Present Inventions

FIGS. 11A–11C illustrate an exemplary method of the present inventions to change the association of a mailbox from one domain to another domain in the messaging system. For ease of reference, "old domain" is used to denote the domain from which the mailbox is being changed, and "new domain" is used to denote the domain to which the mailbox is being changed. Other uses of the terms "old" and "new" follow the same pattern.

Typically, a change in association of domains is carried out with respect to a plurality of mailboxes such as mailboxes having mailbox names with the same domain and with mailbox numbers within a specified range. For purposes of explaining the exemplary method, reference is made to the change in association of a single mailbox. The same method generally applies to a plurality of mailboxes having the same old and same new domains.

After start 110, if the domain to which the mailbox is to be changed is a new domain, then the new domain is created in action 112. Of course, the association of a mailbox may be changed to an existing domain as the new domain, in which case, the creation of a new domain is unnecessary.

In action 114, information for use in the domain change may be obtained or otherwise accessed as necessary. This information corresponds to the entries from the relevant fields of the mailbox record associated with the mailbox having its domain changed and included in the database of the messaging system. As the information is changed, the information may be returned to or changed in the appropriate fields and their storage locations in the messaging system as appropriate so that the information may be used in providing messaging services to the subscriber.

The relevant fields of the mailbox record used in connection with the change in association of the mailbox's domain may include:

a mailbox name (only one entry—domain+mailbox number);

a list of other names (for each entry—domain+other number);

subscriber access data;

caller access data; and a list of routed names (for each entry—domain+number).

These fields are described above in connection with FIG. 3. It is to be noted that the entry in the mailbox name field may not be the same as any entry in the list of other names.

Even though the information used for the change in domain is characterized as being drawn from and used in the described fields of the mailbox record for purposes of this exemplary method, in other methods and systems implementing the present inventions, the same information (directly or functionally the same) may be drawn from, changed, and used in other sources, records, fields, parameters, or the like depending on the set-up of the information (whether directly or functionally the same) relating to mailboxes in the messaging system and the messaging platform.

In action 116, a new mailbox name is created for the mailbox. But instead of replacing the old mailbox name with the new mailbox name in the mailbox name field, the new mailbox name is added as an entry to the field including the list of other names in the mailbox record. In particular, the new mailbox name does not refer to the old domain, but instead refers to the new domain, to-wit: new domain+mailbox number. This new mailbox name is added as an entry to the field including the list of other names in the mailbox record. As noted, even though a new mailbox name is created and added as an entry to the list of other names, the entry in the mailbox name field is not deleted or changed. The entry in the mailbox name field remains the old mailbox name, to-wit: old domain+mailbox number.

Advantageously, the creation of the new mailbox name and its addition as an entry to the field including the list of other names in the mailbox record does not effect the provision of messaging services to the subscriber. Calls that are directed to the subscriber using the old mailbox name of old domain+mailbox number (or old other name of old domain+other number) continue to be properly routed to the subscriber's mailbox based on the information in the mailbox record. In addition, calls that are directed to the subscriber using the new mailbox name of new domain+mailbox number are properly routed to the subscriber's mailbox.

Another field of the mailbox record that may be relevant to the change in domain is the field including the list of other names. Other than the entry of the new mailbox name in action 116, the list of other names may be empty of entries in the mailbox record, or the list may include one or more entries. An entry in the list of other names may include an "other name" as follows: domain+other number. If the list of other names includes one or more entries, then for each entry, in action 118 a new corresponding entry is created. Each new corresponding entry includes a new "other name", to-wit: new domain+corresponding other number. The "other number" in the other name of an existing entry in the list of other names is used as the "corresponding other name" in the new other name of the new corresponding entry for the list of other names.

As noted, even though a new corresponding entry of a new other name is created and added in correspondence to each old entry in the list of other names, the old entries in the list of other names are not deleted nor changed from the field. The entries in the list of other names continue to include the old entries and after action 118 also include the new corresponding entries. Thus, after actions 116 and 118, the total number of entries in the list of other names may be calculated as follows: (2×the number of old entries)+1.

If the list of other names fails to include any entries (other than the new mailbox name added as an entry to the list in action 116), then no new corresponding entries are created or added. However, as noted, the list of other names includes the new mailbox name as an entry from its addition to the list in action 116. Thus, the formula of (2×the number of old entries)+1 is followed because the number of old entries=0, to-wit: (2×0)+1×1.

In action 120, a change is effected in the incoming trunk configuration with respect to the mailbox having its domain changed. In particular, the data relating to the incoming trunk configuration is changed such that the old domain in the mailbox name of the mailbox is changed to the new domain. By this change, the routing of calls is changed to comport with the change in domain of the mailbox.

Advantageously, the results of actions 116 and 118 allow for messaging services to continue to be provided to the subscriber despite the change in the domain in the incoming trunk configuration in action 120. These actions 116 and 118 allowed for such messaging services to continue despite the change in the incoming trunk configuration in action 120 because there are entries in the mailbox name field and in the field including the list of other names that cover both the new domain and the old domain with respect to the subscriber, the subscriber's mailbox name, and the subscriber's other numbers related to the subscriber's mailbox. By this coverage, calls to the subscriber are properly routed to the subscriber's mailbox.

However, in action 122, the action of 116 is undone. Particularly, in action 122, the new mailbox name added as an entry to the field including the list of other names in action 116 is deleted from the list of other names. The old entries in the list of other names are not changed nor deleted from the list.

The undoing action 122 seems anti-intuitive. The undoing action is necessary so as to later allow (in action 126 below) the entry in the mailbox name field to be changed to include the new domain in the mailbox name. Why can't the change in domain occur in the entry in the mailbox name field without the undoing action 122? Because, as noted above, the entry in the mailbox name field cannot be the same as an entry in the list of other names. The entry in the mailbox name field cannot be changed to the new domain without the undoing action 122 because that would result in duplicate entries in the mailbox name field and in the field including list of other names.

Similarly, in action 124, in some embodiments of the present inventions, the action of 118 is undone. Particularly, in action 124, if any new corresponding entries have been added to the list of other names in action 118, the new corresponding entries are deleted from the list of other names. The old entries in the list of other names are not changed nor deleted from the list. This action 124 may not be carried out in all embodiments because it may not be necessary. As explained above in connection with action 122, the undoing action with respect to new mailbox name added from the list of other names is necessary because duplicate entries between the mailbox name field and the field of other names are not allowed. In contrast, the new corresponding entries may not need to be deleted from the list of other names because there may be no similar duplication with the entry of the mailbox name field.

As a result of action 122 (and if carried out of action 124), the entries for the fields of mailbox name and list of other names appear as they did at the beginning of the exemplary method. In other words, after action 122 and action 124, (if taken), the entry for the mailbox name is old domain+ mailbox number, and the entries in the list of other numbers include the old domain+other numbers.

In action 126, the entry in the field of the mailbox name is changed. In the mailbox name field, the old mailbox name is changed to the new mailbox name so as to reflect the new domain. After the change, the entry in the field of the mailbox name appears as: new domain+mailbox number. This change may be implemented by deletion of the old entry and creation of the new entry, or simply the mailbox name in the old entry may have its domain changed to the new domain so as to become the new mailbox name.

Similarly, if action 124 has been carried out, and if the field including the list of other names includes one or more entries, then in action 128, each such entry is changed to a new entry. The old other name in each old entry is changed so as to reflect a new other name in the new entry. After the change, each entry in the list of other names appears as new domain+other number. If action 124 has not been carried out, then instead of changing the old other name in each old entry, each old entry may be deleted so as to leave only the new corresponding entries added in action 118.

The changes in actions 126 and 128 are taken to follow the change in domain effected in the incoming trunk configuration in action 120. Particularly, the changes in actions 126 and 128 are taken to have the mailbox record (particularly the fields of mailbox name and list of other numbers) reflect the domain name change so that calls to the subscriber are properly routed based on the incoming trunk configuration (as changed in action 120) to the subscriber's mailbox including its change in domain association. The changes in actions 126 and 128 may interrupt messaging services to the subscriber, but such interruption is generally very brief (two–six seconds according to the inventors). The interruption is generally brief because only a few seconds are necessary to carry out the changes of actions 126 and 128. The bases are laid for only these few seconds of interruption by the changes that are carried out in actions 116 and 118. The changes effected by actions 116 and 118, as noted, may be carried out without interruption in messaging services to the subscriber. Thus, the present inventions allow for a change in domain association of a mailbox by carrying out certain actions while messaging service continues without interruption so as to allow for only the briefest interruption when necessary.

Referring again to FIGS. 11A–C, in action 130, the list of other numbers is changed further by the addition of an entry for the old mailbox name. In particular, the old mailbox name including the old domain+mailbox number is added as an entry to the list of other numbers. After action 130, all of the entries in the list of other names include the new domain in their mailbox names except for that of the old mailbox name, which includes the old domain.

Action 130 also may be considered anti-intuitive. Why add the old mailbox name as an entry to the list of other numbers when all of the other entries in the list include names having the new domain? Because no action has yet been taken with respect to outgoing signals and messages from the messaging system that pertain to such services as mail waiting indicators (MWIs) that involve the domain aspects of a mailbox. The inclusion of the old mailbox name as an entry to the list of other numbers takes care of these other "outgoing" signals and messages at least until other actions are taken that affect those other signals and messages.

In action 132, the entries in the other fields of the mailbox record are changed as necessary or appropriate. For example, one of the fields of the mailbox record may be the list of routed names. The list of routed names may include as entries mailbox names. For each of these entries, the mailbox name is changed so as to change the old domain to the new domain in the mailbox name. The changes in the other fields are effected so as to properly route calls that may be based on data in these other fields.

In action 134, a change is effected in the integration configuration with respect to the mailbox having its domain changed. In particular, the data relating to the mailbox is changed such that the old domain in the mailbox name of the mailbox is changed to the new domain. By this change, the routing of signals, messages, etc. pertaining to such services as message waiting indicators (MWIs—whether stutter dialtone, visual, or other indicator of a message received for the subscriber) is changed to comport with the change in domain of the mailbox.

In action 136, other references to the old domain of the mailbox in the mailbox record and elsewhere in the messaging system or platform may be changed to the new domain, or deleted as appropriate. The exemplary method ends in action 140.

Conclusion

The exemplary embodiments of the present inventions were chosen and described above in order to explain the principles of the invention and their practical applications so as to enable others skilled in the art to utilize the inventions including various embodiments and various modifications as are suited to the particular use contemplated. The examples provided herein in the written descriptions or in the drawings are not intended as limitations of the present inventions. Other embodiments will suggest themselves to those skilled in the art. Therefore, the scope of the present inventions is to be limited only by the claims below.

We claim:

1. In a messaging system providing messaging services where mailboxes are organized into domains, where each mailbox is assigned a mailbox name including a domain and a mailbox number, where information relating to access of the mailboxes is stored respectively in mailbox records including fields for mailbox name and fields for other names, and where a name included in the field of mailbox name is unique with respect to names included in the field of other names in the same mailbox record, and further, where the messaging system includes an incoming configuration using the domain of the mailboxes to route messages to the mailboxes, a method for changing the association of a selected mailbox from an old domain to a new domain, where the selected mailbox has an old mailbox name including the old domain and a first mailbox number, and where the mailbox name is stored in a field of mailbox name within a mailbox record corresponding to the selected mailbox, the method comprising:

creating a new mailbox name for the selected mailbox, the new mailbox name including the new domain and the first mailbox number;

adding the new mailbox name to a field for other names in the mailbox record;

in the incoming configuration, changing the association of the selected mailbox from the old domain to the new domain;

deleting the new mailbox name from the field for other names in the mailbox record; and changing the old mailbox name to the new mailbox name in the field of mailbox name, whereby adding the new mailbox name in the field of other names without deleting the old mailbox name from the field of mailbox name allows for messages to be routed to the selected mailbox using either the old domain or the new domain so as not to disrupt messaging service to the selected mailbox, and whereby the actions only minimally disrupt messaging service to the selected mailbox.

2. The method of claim 1, wherein the messaging system further comprises an integration configuration for outputting signals for signaling services provided to the selected mailbox, and wherein the integration configuration makes use of the old domain for outputting the signals, further comprising:

adding the old mailbox name to the field of other names so as to comport with the use of the old domain by the integration configuration and to allow for the signaling services to continue to be provided to the selected mailbox; and in the integration configuration, changing the association of the selected mailbox from the old domain to the new domain so that the integration configuration makes use of the new domain instead of the old domain.

3. The method of claim 2, further comprising, deleting the old mailbox name from the field of other names.

4. The method of claim 2, further comprising, changing any mailbox name related to the selected mailbox so that any such mailbox name includes the new domain instead of the old domain in its mailbox name.

5. The method of claim 1, wherein the mailbox record further comprises a field for routed names; and wherein changing the old mailbox name comprises changing the old mailbox name to the new mailbox name in the field of routed names.

6. The method of claim 1, further comprising; creating the new domain.

7. The method of claim 1, wherein the field of other names comprises a second mailbox name including the old domain and a second mailbox number;

wherein creating the new mailbox name comprises creating the new mailbox name and a new second mailbox name for the selected mailbox, the new second mailbox name including the new domain and the second mailbox number; and wherein adding the new mailbox name comprises adding the new mailbox name and the new second mailbox name to the field of other names.

8. The method of claim 7, wherein deleting the new mailbox name comprises deleting the new mailbox name and the new second mailbox name from the field of other names.

9. The method of claim 7, further comprising:
changing the second mailbox name in the field of other names to the new second mailbox name.

10. A method to change association of a selected mailbox from an old domain of mailboxes to a new domain of mailboxes in a messaging platform, the method comprising:
including an identifier of the selected mailbox as associated with the old domain in a mailbox record of the selected mailbox where the identifier may be used to route messages to the selected mailbox;
including a reference to the selected mailbox as associated with the new domain in the mailbox record where the reference may be used to route messages to the selected mailbox;
changing incoming routing information in the messaging platform for the selected mailbox from the old domain to the new domain; and
deleting the reference to the selected mailbox from the mailbox record; and
changing the identifier of the selected mailbox from being associated with the old domain to being associated with the new domain; where the old domain of mailboxes and the new domain of mailboxes are on the messaging platform.

11. The method of claim 10, wherein the messaging platform outputs signals for signaling services provided to the selected mailbox, and wherein the messaging platform makes use of the old domain for outputting the signals, further comprising:
adding an indicator of the selected mailbox as being associated with the old domain to the mailbox record so as to comport with the use of the old domain by the messaging platform;
changing the messaging platform to make use of the new domain instead of the old domain for outputting the signals.

12. The method of claim 11, further comprising deleting the indicator from the mailbox record.

13. The method of claim 10, further comprising:
changing any information in the messaging platform related to the selected mailbox so as to change association of the selected mailbox from the old domain to the new domain.

14. The method of claim 10, wherein including the reference to the selected mailbox comprises:
including the reference to the selected mailbox as associated with the new domain in the mailbox record where the reference may be used to route the messages to the selected mailbox, and
including respectively an additional reference for each other mailbox name included in the mailbox record where the additional reference associates the other mailbox name with the new domain for use in routing the messages to the selected mailbox.

15. The method of claim 14, wherein deleting the reference to the selected mailbox comprises deleting the reference to the selected mailbox and the additional reference from the mailbox record.

16. A system to change association of a selected mailbox from an old domain of mailboxes to a new domain of mailboxes in a messaging platform, the system comprising:
a mailbox record of the selected mailbox including
an identifier of the selected mailbox as associated with the old domain and used to route messages to the selected mailbox,
a reference to the selected mailbox as associated with the new domain and used to route messages to the selected mailbox;
an incoming interface for routing messages to the selected mailbox including the old domain as associated with the selected mailbox, and being operative to change the old domain to the new domain after the reference is included in the mailbox record; and
after the incoming interface includes the new domain as associated with the selected mailbox, the mailbox record for the selected mailbox is operative
to delete the reference, and
to change the identifier of the selected mailbox from being associated with the old domain to being associated with new domain; where the old domain of mailboxes and the new domain of mailboxes are on the messaging platform.

17. The system of claim 16, wherein the messaging platform outputs signals for signaling services provided to the selected mailbox, and wherein the messaging platform makes use of the old domain for outputting the signals, and
wherein the mailbox record is operative to include an indicator of the selected mailbox as being associated with the old domain so as to comport with the use of the old domain by the messaging platform.

18. The system of claim 17, wherein the mailbox record is operative to delete the indicator after the messaging platform changes from the old domain to the new domain for outputting the signals.

19. The system of claim 18, wherein the mailbox record is operative to change any information related to the selected mailbox so as to change association of the selected mailbox from the old domain to the new domain.

* * * * *